(12) United States Patent
Lange et al.

(10) Patent No.: US 9,206,870 B2
(45) Date of Patent: Dec. 8, 2015

(54) BRAKE DISC AND METHOD FOR CHECKING THE WEAR OF A BRAKE DISC

(75) Inventors: Jürgen Lange, Köln (DE); Michael Schorn, Leverkusen (DE)

(73) Assignee: TMD Friction Services GmbH, Leverkusen (DE)

( * ) Notice: Subject to any disclaimer, the term of this patent is extended or adjusted under 35 U.S.C. 154(b) by 5 days.

(21) Appl. No.: 13/876,004

(22) PCT Filed: Jan. 27, 2012

(86) PCT No.: PCT/EP2012/051316
§ 371 (c)(1),
(2), (4) Date: Mar. 26, 2013

(87) PCT Pub. No.: WO2012/104209
PCT Pub. Date: Aug. 9, 2012

(65) Prior Publication Data
US 2013/0299284 A1 Nov. 14, 2013

(30) Foreign Application Priority Data
Feb. 1, 2011 (DE) .......................... 10 2011 000 425

(51) Int. Cl.
F16D 66/02 (2006.01)
F16D 65/12 (2006.01)
F16D 69/00 (2006.01)

(52) U.S. Cl.
CPC .............. F16D 66/027 (2013.01); F16D 65/12 (2013.01); F16D 65/127 (2013.01); F16D 66/02 (2013.01); F16D 66/028 (2013.01); F16D 2069/004 (2013.01)

(58) Field of Classification Search
CPC ..... F16D 66/02; F16D 66/021; F16D 66/026; F16D 66/027
See application file for complete search history.

(56) References Cited

U.S. PATENT DOCUMENTS 1,248,340 A 11/1917 Kinney
2004/0069573 A1* 4/2004 Anderson ................ 188/1.11 L

FOREIGN PATENT DOCUMENTS

| CA | 2316014 A1 * | 6/2001 |
| CN | 1094799 A | 11/1994 |
| CN | 2200075 Y | 6/1995 |
| CN | 1995904 A | 7/2007 |
| DE | 2749772 A1 | 5/1979 |
| DE | 2827411 A1 | 1/1980 |
| DE | 3813493 A1 | 11/1989 |

(Continued)

OTHER PUBLICATIONS

International Search Report for PCT/EP20112/051316 mailed Jul. 30, 2012.

(Continued)

Primary Examiner — Anna Momper
(74) Attorney, Agent, or Firm — Panitch Schwarze Belisario & Nadel LLP

(57) ABSTRACT

The invention relates to a brake disc (1) having a first (2) and a second friction surface (3), wherein the brake disc has at least one first blind hole (4), in particular one first blind bore, and is configured for making reliable wear monitoring of the brake disc possible in such a way that the first blind hole (4) emanates from the first friction surface (2) and ends within the brake disc (1) at a predetermined spacing from the second friction surface (3).

15 Claims, 4 Drawing Sheets

(56) References Cited

FOREIGN PATENT DOCUMENTS

| | | |
|---|---|---|
| DE | 3813493 A1 | 11/1989 |
| DE | 102008015602 A1 | 10/2009 |
| EP | 0670434 A1 | 9/1995 |
| EP | 1063442 A2 | 12/2000 |
| EP | 1063442 A2 | 12/2000 |
| EP | 1108918 A2 | 6/2001 |
| EP | 1243808 A1 * | 9/2002 |
| FR | 2434365 A3 | 3/1980 |
| FR | 2765290 A1 * | 12/1998 |
| FR | 2765290 B1 | 7/1999 |
| GB | 2006900 A | 5/1979 |
| IT | 1206649 B | 4/1989 |
| JP | 2008-144869 A | 6/2008 |
| JP | 2008144869 A | 6/2008 |
| WO | 2006/081610 A1 | 8/2006 |
| WO | WO-2006081610 A1 | 8/2006 |

OTHER PUBLICATIONS

International Search Report issued Jul. 3, 2015 in Int'l Application No. CN201280003500.X.

* cited by examiner

BRAKE DISC AND METHOD FOR CHECKING THE WEAR OF A BRAKE DISC

CROSS-REFERENCE TO RELATED APPLICATIONS

This application is a national stage application (under 35 U.S.C. §371) of PCT/EP2012/051316, filed Jan. 27, 2012, which claims benefit of German application 10 2011 000 425.4, filed Feb. 1, 2011.

TECHNICAL FIELD AND STATE OF THE ART

The invention relates to a method for checking the wear of a brake disc having at least one blind hole that ends inside the brake disc at a distance from a friction surface which is smaller than or equal to the maximum permissible wear abrasion of the friction surface.

The invention also relates to a brake disc having a first friction surface and a second friction surface, whereby the brake disc has at least a first blind hole, especially a first drilled blind hole, whereby the first blind hole starts at the first friction surface and ends inside the brake disc at a predefined distance from the second friction surface.

The invention likewise relates to a brake system having such a brake disc and to a testing means for checking the wear of such a brake disc.

European patent application EP 0 670 434 A1 discloses a brake disc for the disc brakes of vehicles having opposing brake shoes that each press against a ring-shaped friction surface of the brake disc. In order to visually determine the state of wear of the brake disc without having to use measuring instruments, the proposal is made to create in at least one of the two friction surfaces recesses having a depth that corresponds to the maximum permissible wear of the friction surface.

European patent application EP 1 108 918 B1 discloses a brake disc that essentially has a brake disc cast element. The brake disc cast element has a first outer section and an axially opposite additional outer section, whereby these outer sections each have an outer brake contact surface and essentially parallel inner surfaces. The outer brake contact surfaces are provided for engagement with a pair of opposing brake friction pads, whereby the opposing brake contact surfaces sustain essentially concave wear during use. A predefined number of holes is provided in each of the essentially parallel inner surfaces of the outer sections of the brake disc cast element at various predefined radial places of a center hub of the brake disc cast element behind the outer brake contact surface and having various predefined depths and distances from the brake contact surface, so that the holes are initially not visible due to the presence of brake disc material, but can become visible individually as the brake disc material gradually sustains concave wear due to braking. This translates into a display of the extent and location of wear on the brake contact surfaces of the brake disc.

German Patent application DE 27 49 772 A1 discloses a disc brake whose friction surfaces are provided with recesses and whose maximum depth corresponds to the maximum permissible wear of the brake discs. Once the recesses are no longer visible, the maximum permissible wear limit has been reached. The brake disc, however, has the drawback that the state of wear is laborious to check since this requires a direct visual inspection. This is problematic with an installed brake disc, particularly in view of the tight space and poor lighting conditions.

To the extent that it is even possible to inspect the state of wear of the above-mentioned brake discs, in other words, to inspect more than just whether the maximum permissible wear limit has been reached, these brake discs have the disadvantage that the brake disc wear can only be monitored through a visual inspection directed at the side of the brake disc that is to be checked. Since the area of the installed brake disc is usually hard to access and poorly illuminated, errors can occur, particularly in case of a visual inspection.

German patent application DE 28 27 411 A1 discloses a brake disc, especially for vehicle disc brakes. One of the sides of the brake disc facing away from the brake contact surface has a recess that extends in the direction of the brake contact surface and that ends at a distance from the brake contact surface, corresponding to the maximum permissible wear of the brake disc in the area of the brake contact surface. Once the maximum permissible wear limit has been reached, the blind hole is broken open. A probe is provided whose tip can be brought into contact with the brake contact surface through a cover plate. Once contact has been established, the brake disc is rotated in order to ascertain whether the tip of the probe does or does not catch into the blind hole that would be broken open if the maximum permissible wear limit had been exceeded. This device, however, merely makes it possible to ascertain whether a brake disc is worn out or not. It is not possible to obtain information about the state of wear of the brake disc prior to its reaching the maximum permissible wear limit.

SUMMARY OF THE INVENTION

It is an objective of the present invention to put forward a method for checking the wear of a brake disc having at least one blind hole that makes it possible to ascertain not only the presence of maximum permissible wear but, especially also automatically, to reliably determine the current state of wear, which is not necessarily the maximum permissible state of wear.

This objective is achieved by a method that is characterized in that the thickness of brake disc material between the end of the blind hole and the friction surface is determined.

Another objective of the present invention is to put forward a brake disc that makes it possible, especially also automatically, to reliably determine the current state of wear, which is not necessarily the maximum permissible state of wear.

This objective is achieved by a brake disc that is characterized in that a. starting at the first blind hole, there is an additional blind hole or a through hole whose diameter is smaller than that of the first blind hole and which is coaxial to the first blind hole, and/or
b. starting at the first blind hole, there is a cascade of drilled holes whose diameters decrease and which run in the same direction as the first blind hole, and/or
c. starting at the first blind hole, there is another conically tapering through hole that is coaxial to the first blind hole.

The invention especially has the advantage that it allows a reliable, preferably automatic and/or continuous, monitoring of the wear of the brake disc.

A particularly reliable monitoring of the brake disc wear can be achieved by measuring the amount the radiation passing through the blind hole and through the brake disc material that is at the end of the blind hole and that has not yet abraded, or else through a through hole that has evolved from the blind hole due to abrasion caused by wear.

This principle can be easily illustrated with reference to a simple embodiment: in a brake disc that is not at all worn out, there is so much brake disc material above the blind hole that no light coming from one side of the brake disc can pass through the blind hole to the other side of the brake disc. As the wear increases, the brake disc layer above the blind hole becomes increasingly thinner, so that light gradually starts to shine through. As soon as the brake disc layer has reached the permissible wear limit, the blind hole will have become a through hole, so that light from a light source located on one side of the brake disc can be easily and reliably seen on the other side of the brake disc. But even before the maximum permissible wear limit has been reached, the amount of radiation passing through increases as the wear progresses, so that information becomes available about the state of wear, even if the maximum permissible wear limit has not yet been reached.

Such a continuous measuring method, irrespective of whether it is carried out purely visually or by means of sensors, is considerably more reliable than a method in which the brake disc can be inspected merely by looking at it from the top. Preferably, the distance between the first blind hole and the second friction surface is equal to or smaller than the maximum permissible wear abrasion of the second friction surface.

In a particularly advantageous embodiment, the brake disc has at least a second blind hole, especially a second drilled blind hole, that starts at the second friction surface and ends inside the brake disc at a predefined distance from the first friction surface. Here, it can especially be provided that the distance between the second blind hole and the first friction surface is smaller than or equal to the maximum permissible wear abrasion of the first friction surface.

Such an embodiment has the very special advantage that the wear of the brake disc of the first friction surface can be monitored completely independently of the wear of the brake disc of the second friction surface. Since the monitoring takes place according to the invention in the form of a continuous process, in other words, by measuring and visually monitoring radiation that passes from one side of the brake disc to the other side of the brake disc, it is possible to conduct the monitoring of the first friction surface as well as of the second friction surface exclusively from one side.

Therefore, a brake system fitted with the brake disc according to this embodiment of the invention does not need to undergo a brake disc inspection from both sides and/or to have sensors on both sides of the brake disc in order to detect wear of the brake disc. Rather, it is sufficient to carry out a visual inspection from only one side or else to install a sensor or several sensors on only one side of the brake disc. This works because of the fact that it is immaterial for the measuring or monitoring by means of a continuous method whether the radiation, especially the light, first passes through the drilled blind hole and subsequently through the worn brake discs or vice versa.

In one advantageous embodiment of the brake disc, the first blind hole and the second blind hole are arranged next to each other and/or at a radial distance from each other. In particular, such an arrangement allows the independent monitoring of the wear of both friction surfaces from one side of the brake disc. In particular, such an arrangement also allows the monitoring and/or measurement of the brake disc wear of both friction surfaces simultaneously, preferably independent of each other.

The brake disc also can have a cavity in its interior, especially a cavity for interior ventilation. With such an embodiment, the first blind hole and/or the second blind hole runs through the cavity.

In a special embodiment, the first blind hole and the second blind hole are at different radial distances from the axis of rotation of the brake disc.

As an alternative, it also can be provided that the first blind hole and the second blind hole are at the same radial distance from the axis of rotation of the brake disc. This embodiment has the special advantage that the state of wear of the first friction surface and the state of wear of the second friction surface can be checked using one and the same sensor. This can be done, for instance, in such a way that, first of all, the first blind hole is turned by rotating the brake disc into the measuring field of the sensor, and subsequently, the second blind hole is turned by rotating the brake disc into the measuring field of the sensor. In particular, the state of wear of the first friction surface and the state of wear of the second friction surface can be continuously monitored and/or measured alternately by the sensor every time the wheel turns during operation.

Naturally, as already mentioned, as an alternative, it also is possible to install several sensors, whereby a first sensor is configured and arranged so as to monitor the state of wear of the first friction surface, while a second sensor is configured and arranged so as to monitor the state of wear of the second friction surface.

In one especially advantageous embodiment, there is the additional possibility to reliably detect the brake disc wear by means of a feeler. In such an embodiment, it is provided that, starting at the first blind hole, there is an additional blind hole or a through hole whose diameter is smaller than that of the first blind hole and which is coaxial to the first blind hole. Analogously, it can be additionally provided that, starting at the second blind hole, there is an additional blind hole or a through hole whose diameter is smaller than that of the second blind hole and which is coaxial to the second blind hole.

For the brake disc inspection, the above-mentioned embodiment can have a probe whose cross section has a stepped profile, whereby the diameter of the tip of the probe is configured in such a way that it can be inserted into the additional blind hole or into the through hole. Adjoining the tip of the probe, there is a detection section having a larger diameter which is configured in such a way that it can be inserted into the first blind hole or into the second blind hole. If only the tip of the probe can be inserted into an opening of the brake disc, then there is still enough friction material present. If the friction material has been abraded all the way down to the end of the blind hole and if the blind hole has thus become a through hole, then the probe can be inserted further into the brake disc than before. In concrete terms, then the section having the larger diameter and adjoining the tip of the probe also penetrates the brake disc.

In another embodiment, which works essentially similarly, but which yields more precise information about the current wear of the brake disc, it is provided that, starting at the first blind hole, there is a cascade of drilled holes whose diameters decrease and that run in the same direction as the first blind hole. Analogously, it can be additionally provided that, starting at the second blind hole, there is a cascade of drilled holes whose diameters decrease and that run in the same direction as the first blind hole. With such an embodiment, the probe can have not only two, but rather a larger number of testing sections whose diameters increase. In particular, these testing sections can have a colored marking for purposes of showing the user whether the brake disc wear is of a small or large magnitude.

In another embodiment, which works essentially similarly, but which yields continuous information about the brake disc wear, it is provided that, starting at the first blind hole, there is a conically tapering blind hole or another conically tapering through hole that is coaxial to the first blind hole. Alternatively or additionally, it can also be provided that, starting at the second blind hole, there is another conically tapering blind hole or a through hole that is coaxial to the second blind hole. Such an embodiment allows an even more precise inspection of the brake disc wear. For example, a scale that directly and virtually continuously indicates the extent of wear can be arranged on the conical surface of the probe.

In a particularly advantageous embodiment of a brake system equipped with a brake disc according to the invention, it is provided that a sensor determines the presence and/or thickness of brake disc material between the end of the first blind hole and the second friction surface. Alternatively or additionally, it can be provided that a sensor determines the presence and/or thickness of brake disc material between the end of the second blind hole and the first friction surface.

In a special embodiment of the brake system according to the invention, the sensor is configured as an optical sensor. For instance, the sensor can be configured as a photo cell. In particular, it can be provided that the sensor is installed on one side of the brake disc while a light source is installed on the other side of the brake disc, whereby the sensor is designed to receive the light from the light source through the blind hole and, provided that a certain amount of wear has occurred, through the brake disc material or through the through hole that has evolved from the blind hole due to the abrasion caused by wear.

Instead of light, it is also possible to use another type of electromagnetic radiation.

In one particularly advantageous embodiment, the sensor has a light barrier.

In one special embodiment, the sensor detects the surface of the first friction surface and/or of the second friction surface mechanically and/or capacitively and/or inductively.

In an especially advantageous embodiment of the brake system according to the invention, the sensor is integrated into a system for monitoring brake pad wear and/or it is connected to a system for monitoring brake pad wear. In particular, it can be provided that the sensor and a system for monitoring brake pad wear use the same warning line and/or are associated with the same warning line. Such an embodiment entails the advantage that only a single warning line has to be installed in the vehicle and it is then utilized by the sensor as well as by the system for monitoring brake pad wear.

Advantageously, it also can be provided according to the invention that the sensor and/or a system for monitoring brake disc wear are integrated into a system for monitoring brake pad wear. As an alternative, it can be provided that the sensor and/or a system for monitoring brake disc wear are connected to a system for monitoring brake pad wear. In particular, it can be advantageously provided that the sensor and/or system for monitoring brake disc wear use the same warning line as a system for monitoring brake pad wear.

Especially in a configuration involving a continuous measurement method, it also is possible to monitor brake disc wear while the brake disc is turning, particularly during the operation of a vehicle in which the brake disc according to the invention has been installed. Here, as already explained, the brake disc wear of both friction surfaces can be measured and/or monitored independently of each other.

In an especially advantageous embodiment, it is provided that the sensor works automatically and/or that monitoring takes place automatically.

In one advantageous embodiment, the wear monitoring is continuous, although it is likewise possible according to the invention for the wear monitoring to take place at predefined or predefinable time intervals.

For example, a probe having a testing tip can be employed as a testing means to check the wear of a brake disc according to the invention. Depending on the design of the brake disc, the testing tip can be configured, for example, to be conical and/or to have several testing sections whose diameters decrease. In particular, the testing means can be configured and intended for use while the brake disc is at rest, especially during a vehicle inspection.

In an especially advantageous configuration, it is provided that the testing means is inserted into the first blind hole and/or into the additional blind hole and/or into the through hole and/or into the cascade of drilled holes while the brake disc is at rest, especially during a vehicle inspection. In particular, it can be provided that the testing means is inserted until it stops in the first blind hole and/or in the additional blind hole and/or in the through hole and/or in the cascade of drilled holes in order to obtain information about the state of wear of each friction surface on the basis of the penetration depth. For this purpose, the testing means can advantageously have at least one marking from which the penetration depth can be read off as a measure of the wear. The marking can be configured, for instance, as a colored marking. For example, the marking can be configured in the form of adjacent rings of different colors. As an alternative or in addition, the marking can also have a scale.

Particularly advantageous is a system consisting of a brake disc with an opening, especially a blind hole, a through hole, a conically tapering blind hole, a conically tapering through hole, a cascade of drilled holes and a testing means that can be inserted into the opening, whereby the testing means, especially from the side of the brake disc facing away from the friction surface that is to be monitored, can be inserted to different depths in the opening until it stops as a function of the state of wear of the brake disc. Alternatively or additionally, as the wear progresses, it can be provided that the testing means can be inserted deeper until it stops in the opening, especially from the side of the brake disc facing away from the friction surface that is to be monitored.

Additional objectives, features and advantageous application possibilities of the present invention ensue from the description below of embodiments with reference to the drawings. In this context, all of the described and/or depicted features, either on their own or in any meaningful combination, constitute the subject matter of the present invention, also irrespective of their compilation in the claims to which they refer back.

DESCRIPTION OF THE DRAWINGS

The following is shown.

DETAILED DESCRIPTION OF EMBODIMENTS

Figure 1:
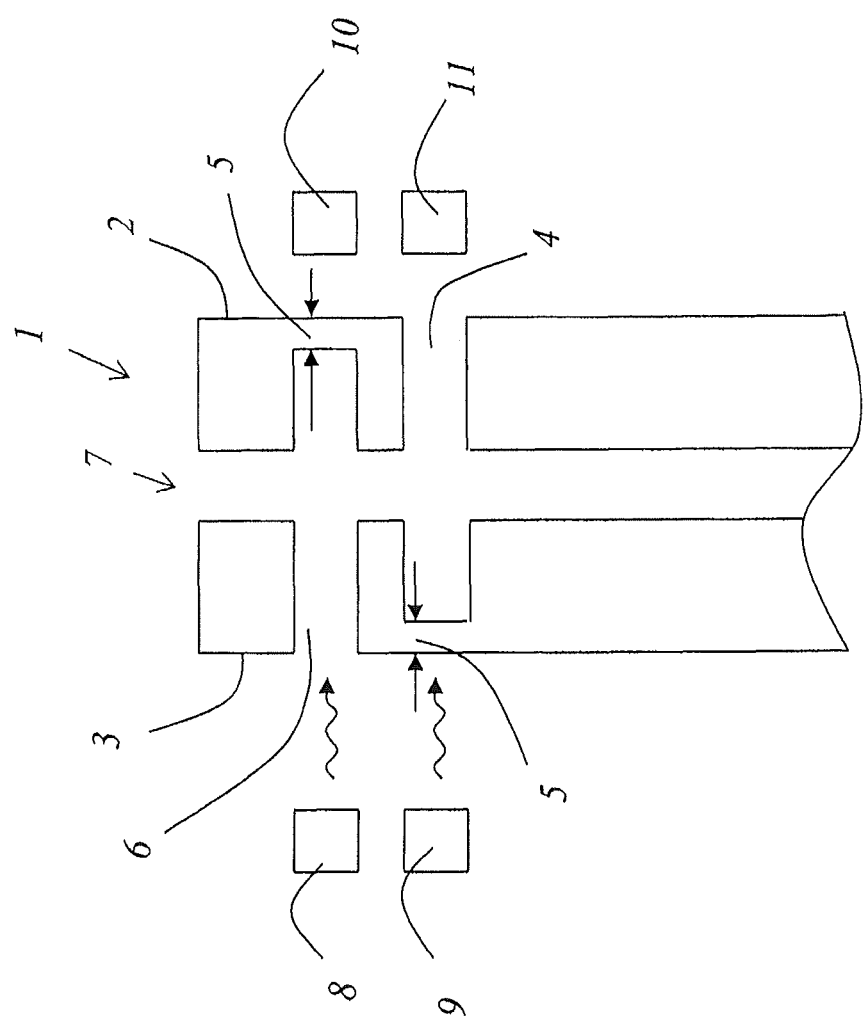
FIG. 1 a brake disc according to the invention, with a sensor for monitoring the wear abrasion.

FIG. 1 shows a brake disc 1 according to the invention, having a first friction surface 2 and a second friction surface 3. The brake disc 1 has a first blind hole 4 that starts at the first friction surface 2 and ends inside the brake disc 1 at a predefined distance 5 from the second friction surface 3. Moreover, the brake disc 1 has a second blind hole 6 that starts at the second friction surface 3 and ends inside the brake disc 1 at a predefined distance 5 from the first friction surface 2. The brake disc has a cavity 7 for internal ventilation purposes. The blind holes 4, 6 run in an imaginary continuation through the cavity 7.

A first radiation source 8 is provided, which can be configured, for instance, as an LED lamp and which faces the second friction surface 3. Furthermore, a second radiation source 9 is provided, which can likewise be configured as an LED lamp and which is associated with the first friction surface 2. The first radiation source 8 is arranged in the radial direction at the height of the second blind hole, while the second radiation source 9 is arranged in the radial direction at the height of the first blind hole 4. A first sensor 10 is provided which is configured and arranged in such a way that it receives radiation that passes through the second blind hole and through the brake disc material of the first friction surface 2 (sufficiently thinned due to abrasion). Analogously, another sensor 11 is provided which is configured to receive radiation passing through the first blind hole and through the second friction surface.

This embodiment has the special advantage that the sensors are arranged exclusively on one side of the brake disc 1. Here, it would also be very well possible to employ a single radiation source instead of the two radiation sources 8, 9.

Figure 2:
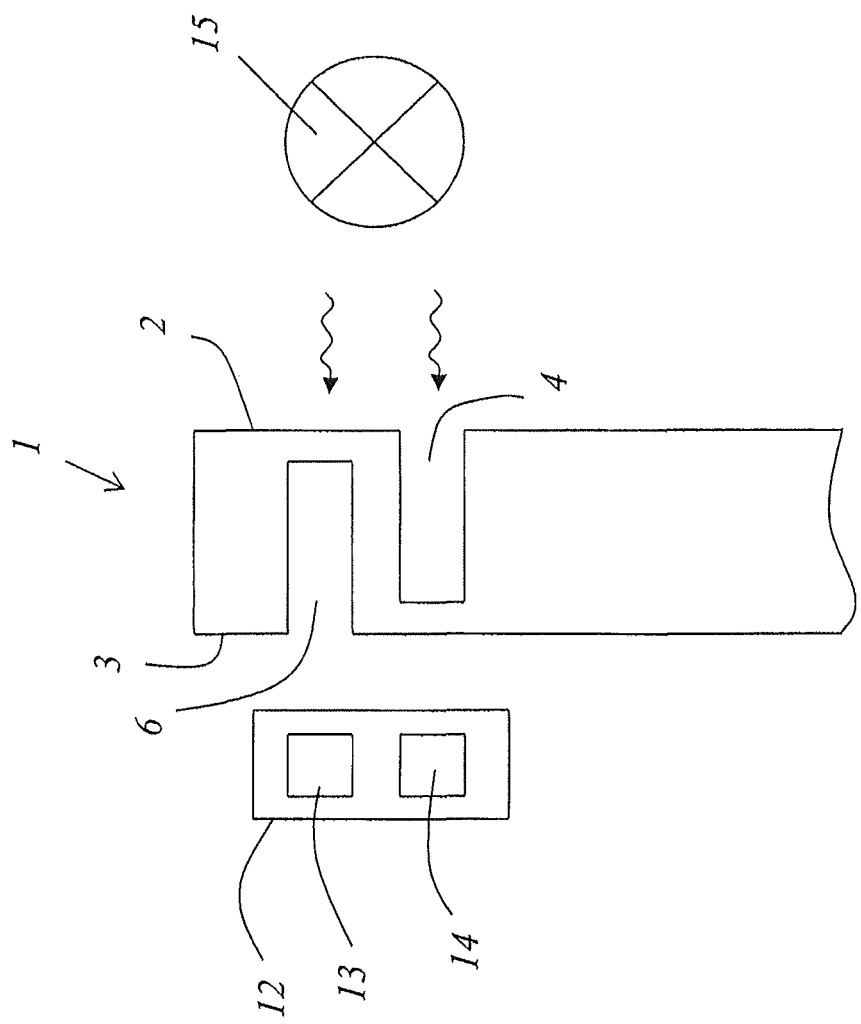
FIG. 2 another brake disc according to the invention with internal ventilation, having sensors for monitoring wear abrasion.

FIG. 2 shows another brake disc 1 according to the invention, without internal ventilation, which has a first blind hole 4 and a second blind hole 6 likewise at a radial distance from each other. A sensor 12 is provided which has two individual sensors 13, 14. The sensor can contain, for instance, several photo cells. A light source 15 is arranged on the side of the brake disc 1 located opposite from the sensor 12. The first individual sensor 13 is configured to detect the wear of the first friction face 2, while the second individual sensor 14 is configured to detect the wear of the second friction surface 3.

As in the case of the embodiment shown in FIG. 1, the magnitude of the (light) radiation received by the sensor 12 increases as the wear of the friction surfaces progresses. In other words, the thinner the brake disc material adjacent to the ends of the blind holes 4, 6, the more radiation can pass through this area and the more radiation is received by the sensor 12.

Figure 3:
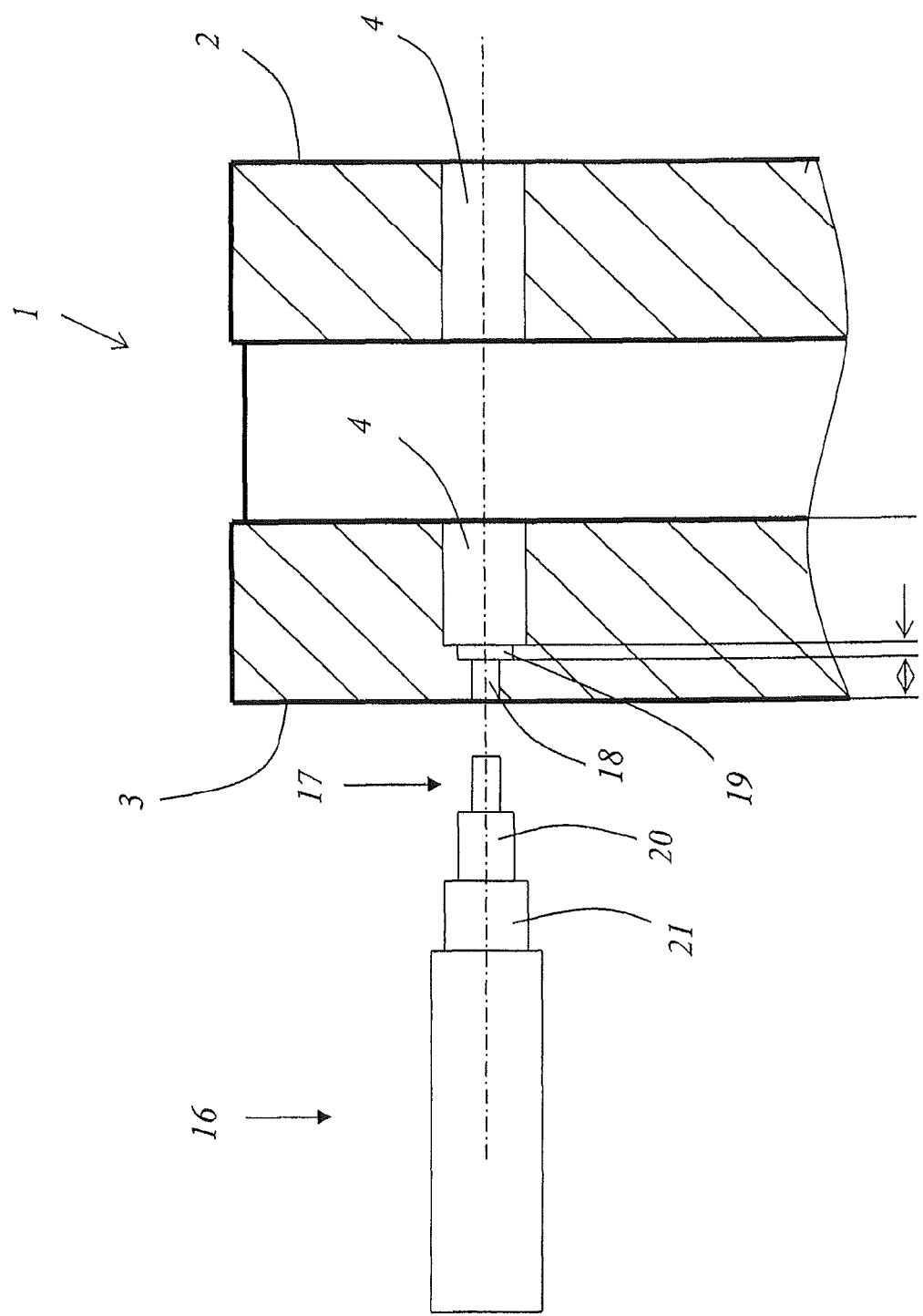
FIG. 3 another brake disc according to the invention with internal ventilation.

FIG. 3 illustrates how, as an alternative or in addition to a continuous measurement, the wear of the brake disc can be measured by means of a probe 16. The probe 16 has a testing tip 17 that can be inserted into a through hole 18 that has evolved from a blind hole 4. In a brake disc that is not at all worn out, it is only possible to insert this testing tip 17 into the brake disc 1. Starting at the blind hole 4, there is an additional blind hole 19 whose diameter corresponds to the diameter of another testing section 20 adjacent to the testing tip 17 of the probe 16. As the wear of the brake disc progresses, not only the testing tip 17 of the probe 16, but also the additional testing section 20 adjacent to the testing tip 17 can be inserted into the brake disc. Once the area of the brake disc in which the additional blind hole 19 was present has been abraded due to wear, a third testing section 21 of the probe 16 whose diameter is larger than the diameter of the additional testing section 20 can be inserted into the brake disc. Once this has happened, the brake disc is worn out and has to be replaced.

The tip 17 and the different sections 20, 21 of the probe 16 can be marked by different colors, for instance, in the form of a green-yellow-red display, in order to alert the user about the state of wear.

Figure 4:
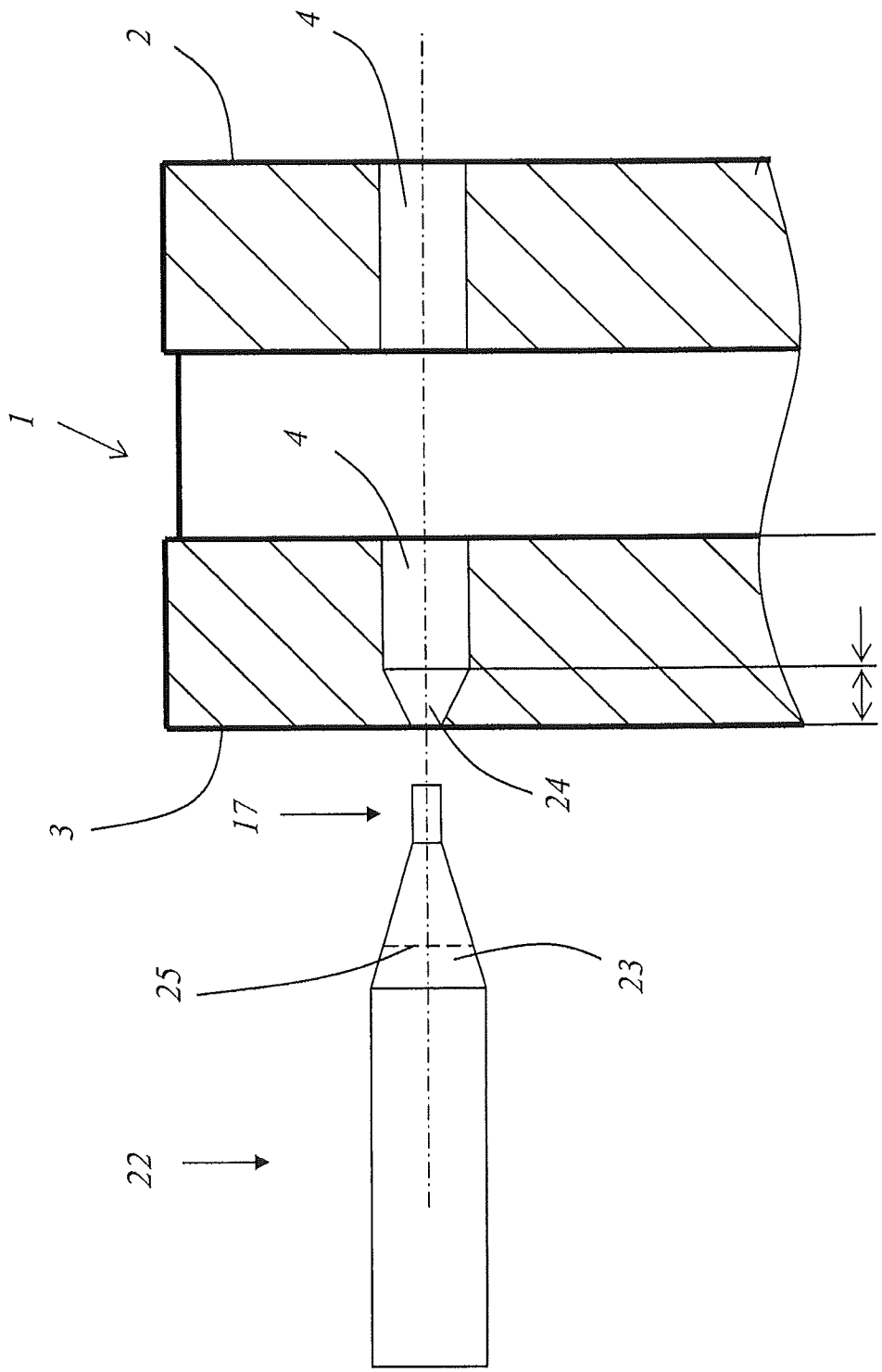
FIG. 4 a brake disc according to the invention with internal ventilation, having a different configuration.

FIG. 4 shows a brake disc 1 in which, starting at the first blind hole 4, there is another, conically tapering through hole 24. FIG. 4 illustrates how this configuration can entail a measurement of the brake disc wear by means of another probe 22 as an alternative or in addition to a continuous measurement.

The other probe 22 has a testing tip 17 that can be inserted into the conically tapering through hole 24. In the case of a brake disc that is not at all worn out, only the testing tip 17 can be inserted into the brake disc 1. As the wear of the brake disc progresses, not only the testing tip 17 of the probe 22, but also the conical testing section 23 adjacent to the testing tip 17 can also be inserted into the brake disc. Once the area of the brake disc in which the conically tapering through hole 24 was present has been abraded due to wear, the conical testing section 23 of the probe 22 can be inserted all the way to a marking 25 that indicates that the wear limit has been reached. Once this has happened, the brake disc 1 is worn out and has to be replaced.

The tip 17 and the conical testing section 23 of the probe 16 can have a scale, for example, in the form of a percentage display, providing information about the state of wear.

| List of reference numerals | |
|---|---|
| 1 | brake disc |
| 2 | first friction surface |
| 3 | second friction surface |
| 4 | first blind hole |
| 5 | distance (maximum permissible wear abrasion) |
| 6 | second blind hole |
| 7 | cavity |
| 8 | first radiation source |
| 9 | second radiation source |
| 10 | first sensor |
| 11 | second sensor |
| 12 | sensor |
| 13 | first individual sensor |
| 14 | second individual sensor |
| 15 | light source |
| 16 | probe |
| 17 | testing tip |
| 18 | through hole |
| 19 | additional blind hole |
| 20 | additional testing section |
| 21 | third testing section |
| 22 | another probe |
| 23 | conical testing section |
| 24 | conically tapering through hole |
| 25 | marking for wear limit |

The invention claimed is:

1. A brake disc (1), comprising:
a first friction surface (2) and a second friction surface (3), wherein the brake disc (1) defines at least a first blind hole (4) with an axis and a diameter and defines at least a second blind hole (6) with a diameter and at least another second blind hole or a second through hole, with said first blind hole (4) starting at the first friction surface and ending inside the brake disc at a predefined distance from the second friction surface, and wherein starting at the first blind hole (4), there is a through hole (19) whose diameter is smaller than that of the first blind hole and which is coaxial to the first blind hole, and with said second blind hole (6) starting at the second friction surface (3) and ending inside the brake disc (1) at a predefined distance from the first friction surface (2), and with said another second blind hole or through hole being coaxial to the second blind hole and having a diameter that is smaller than the diameter of the second blind hole (6).

2. The brake disc (1) according to claim 1, wherein the first blind hole (4) and the second blind hole (6) are at different radial distances from the axis of rotation of the brake disc.

3. The brake disc (1) according to claim 1, wherein the brake disc (1) has a cavity (7) in its interior, and the first blind hole (4) or the second blind hole (6) runs through the cavity (7).

4. The brake disc according to claim 1, wherein the first blind hole is an opening selected from the group consisting of: a blind hole, a through hole, a conically tapering blind hole, a conically tapering through hole, and a cascade of drilled holes of varying diameter.

5. The brake disc according to claim 1, wherein the additional through hole is an opening selected from the group consisting of: a conically tapering through hole, and a cascade of drilled holes of varying diameter.

6. A brake system, comprising:
a brake disc having a first friction surface (2) and a second friction surface (3), wherein the brake disc (1) defines at least a first blind hole (4) with an axis and a diameter, and defines at least a second blind hole (6) with a diameter and at least another second blind hole or a second through hole, with said first blind hole (4) starting at the first friction surface and ending inside the brake disc at a predefined distance from the second friction surface, and wherein starting at the first blind hole (4), there is a through hole (19) whose diameter is smaller than that of the first blind hole and which is coaxial to the first blind hole, and with said second blind hole (6) starting at the second friction surface (3) and ending inside the brake disc (1) at a predefined distance from the first friction surface (2), and with said another second blind hole or through hole being coaxial to the second blind hole and having a diameter that is smaller than the diameter of the second blind hole (6); and
a sensor (12) that determines, by continuous monitoring, the thickness of brake disc material between the end of the first blind hole (4) and the second friction surface (3).

7. The brake system according to claim 6, wherein the sensor (12) is a sensor selected from the group consisting of: an optical sensor, a sensor with a light barrier, and a radiation sensor.

8. The brake system according to claim 6, wherein the sensor (12) detects the surface of the first friction surface (2) or the surface of the second friction surface (3) mechanically or capacitively or inductively.

9. The brake system according to claim 6, wherein the sensor (12) is integrated into or connected to a system for monitoring brake disc wear.

10. The brake system according to claim 9, wherein the sensor (12) and a system for monitoring brake disc wear use are associated with the same warning line.

11. The brake system according to claim 9, wherein the sensor (12) and system for monitoring brake disc wear are integrated into or connected to a system for monitoring brake pad wear.

12. The brake system according to claim 7, wherein the sensor (12) is configured to measure the amount of radiation passing through the first blind hole (4) and the brake disc material between the end of the first blind hole (4) and the second friction surface (3) or through a first through hole that has evolved from the first blind hole due to abrasion caused by wear.

13. The brake system according to claim 7, wherein the sensor (12) is configured to measure the amount of radiation passing through a second blind hole (6) and the brake disc material between the end of the second blind hole (6) and the first friction surface (2) or through a second through hole that has evolved from of the second blind hole (6) due to abrasion caused by wear.

14. A brake disc (1), comprising:
a first friction surface (2) and a second friction surface (3), wherein the brake disc (1) defines at least a first blind hole (4) with an axis and a diameter and defines at least a second blind hole (6) with a diameter, with said first blind hole (4) starting at the first friction surface and ending inside the brake disc at a predefined distance from the second friction surface, and wherein starting at the first blind hole (4), there is a through hole (19) whose diameter is smaller than that of the first blind hole and which is coaxial to the first blind hole, and with said second blind hole (6) starting at the second friction surface (3) and ending inside the brake disc (1) at a predefined distance from the first friction surface (2), and wherein the first blind hole (4) and the second blind hole (6) are at different radial distances from the axis of rotation of the brake disc.

15. The brake disc according to claim 14, wherein the brake disc (1) has a cavity (7) in its interior, and the first blind hole (4) or the second blind hole (6) runs through the cavity (7).

* * * * *